United States Patent [19]
Kado et al.

[11] Patent Number: 5,410,609
[45] Date of Patent: Apr. 25, 1995

[54] APPARATUS FOR IDENTIFICATION OF INDIVIDUALS

[75] Inventors: Yoshiyasu Kado, Kadoma; Kunio Nobori; Masamichi Nakagawa, both of Hirakata; Fumio Maehara, Moriguchi, all of Japan

[73] Assignee: Matsushita Electric Industrial Co., Ltd., Kadoma, Japan

[21] Appl. No.: 926,914

[22] Filed: Aug. 7, 1992

[30] Foreign Application Priority Data

Aug. 9, 1991 [JP] Japan .................. 3-200608

[51] Int. Cl.⁶ ............................. G06K 9/00
[52] U.S. Cl. ................... 382/2; 340/825.34
[58] Field of Search ................. 382/2, 3, 5; 340/825.34, 825.3

[56] References Cited

U.S. PATENT DOCUMENTS

| | | |
|---|---|---|
| 4,408,343 | 10/1983 | Neill et al. . |
| 4,827,532 | 5/1989 | Bloomstein .................. 382/41 |
| 4,841,575 | 6/1989 | Welsh et al. .................. 382/2 |
| 4,890,242 | 12/1989 | Sihha et al. . |
| 4,908,625 | 3/1990 | Anthouard et al. . |
| 4,941,191 | 7/1990 | Miller et al. . |
| 4,975,969 | 12/1990 | Tal ........................... 382/2 |

Primary Examiner—David K. Moore
Attorney, Agent, or Firm—Ratner & Prestia

[57] ABSTRACT

In an apparatus for identification of individuals, a facial image of an individual to be identified is inputted into a visual image input unit and characteristic points of the inputted facial image are extracted by a characteristics extracting unit. Characteristic points of expressionless facial images of individuals to be identified are stored in a data base. The difference between the characteristic points from the data base of individuals and the characteristic points from the inputted facial image is detected by a difference detecting unit. Further, the apparatus is equipped with a database of expression muscles wherein expression muscle movement vectors to form facial expressions are described. The apparatus is also equipped with an information processing unit whereby the difference information obtained from the difference detecting unit and the information as described in the data base of expression muscles are processed. By this processed information, coupled with the facial image inputted from the visual image input unit, the subject in question is identified.

6 Claims, 2 Drawing Sheets

APPARATUS FOR IDENTIFICATION OF INDIVIDUALS

BACKGROUND OF THE INVENTION

This invention relates to an apparatus for identification of individuals by making use of a data base of their facial images that are inputted from a video camera and the like.

A typical apparatus, so far existent, for identifying an individual by means of reading his facial image is the one as carried in the official gazette Japanese Patent Laid-Open No. 63-177273. The setup of the aforementioned apparatus is explained in the following:

FIG. 2 is a block diagram showing an example of the conventional apparatuses for identifying an individual by reading his facial image. Item 11 is a visual image input unit to input a facial image, item 12 is a characteristics extracting unit consisting of an A/D converter, a central processing device, a memory, etc., item 13 is a data base of individuals wherein characteristic points of each individual's face are stored and item 14 is an information processing unit wherein the differences obtained through comparing pieces of the information from the characteristics extraction unit 12 with the characteristic information from the data base of individuals 13 are detected and utilized for a correct recognition of a particular individual in question by checking the magnitude of the differences to determine whether it is exceeding a certain threshold value or not.

According to the conventional technology as described in the foregoing, recognition of an individual is carried out by detecting the differences between the characteristic points of a facial image inputted from the visual image input unit 11 and those of the facial images stored in the data base of individuals 13 through the information processing unit 14 and by making a judgment on the magnitude of the differences. However, when the facial expressions are different between the facial images stored in the data base of individuals 13 and the image inputted from the visual image unit 11 in the aforementioned case, the differences between the two kinds of characteristic points tend to become so large that the same single person is sometimes recognized as two separate individuals. In order to prevent this wrong recognition from taking place., it is necessary to select characteristic points that are not likely to be affected by changes in facial expressions. However, the characteristic points less affected by facial expressions are limited to a small number of places such as the both ends of an eye, the nose top, etc. As the number of characteristic points decreases, there exist more risks of identifying the same single person as two different individuals.

According to a prior art as described in U.S. Pat. No. 4,975,969, recognition of a correct person is carried out by the steps of first calculating the positions of respective centers of right and left irises, nose top, and center of mouth, and then making use of the distances between right iris and nose, left iris and nose, right iris and mouth, left iris and mouth, and nose and mouth respectively, all the distances being normalized by the distance between right and left irises. However, no information of expression muscles is utilized in this case, therefore resulting in a problem of deterioration in accuracy due to shifting of the center position of mouth or the like caused by changes in facial expressions.

This invention relates to a method of identifying an individual correctly by utilizing even a facial image of abundant expressions without resorting to a reduction of characteristic points in solving the above mentioned problem.

SUMMARY OF THE INVENTION

In order to achieve the foregoing object, this invention relates to an apparatus for identification of individuals comprising a visual image input unit for inputting a facial image of an individual to be recognized, a characteristics extracting unit whereby characteristic points of the facial image inputted from the visual image input unit are extracted, a data base of individuals wherein characteristic points of an expressionless facial image of all the individuals to be recognized are stored, a difference detecting unit whereby the differences between the characteristic points of the input visual image gained from the characteristics extracting unit and the characteristic points from the data base of individuals are extracted, a data base of expression muscles wherein movement vectors of expression muscles for making facial expressions are stored, and a information processing unit whereby an individual is identified through processing of the difference information gained from, the difference detecting unit, the information stored in the data base of expression muscles, and the facial image inputted from the visual image input unit.

In other words, when a judgment is made about an agreement between the facial image inputted from the visual image input unit and the one stored in the data base of individuals, a more precise recognition is made possible by having the information of muscle movement that corresponds to changes in facial expressions and which is stored in the data base of expression muscles together with the plain information of the differences detected through the difference detecting unit.

For example, when the muscle movement information derived from facial expression changes is expressed in terms of a movement vector at characteristic points of facial images, and the plain differences detected by the difference detecting unit are due to changes in facial expressions, then the differences are likely present within the movement vector as stored in the data base of expression muscles. On the other hand, the differences are not likely present within the movement vector in case where the plain differences detected by the difference detecting unit are not due to changes in facial expressions. By this method, it is made possible to identify an individual in spite of abundant changes in facial expressions and enhance the recognition accuracy.

Keys to the diagrams:
1—Visual Image Input Unit
2—Characteristics Extracting Unit
3—Data Base of Individuals
4—Difference Detecting Unit
5—Data Base of Expression Muscles
6—Information Processing Unit

DETAILED DESCRIPTION OF THE INVENTION

Figure 1:
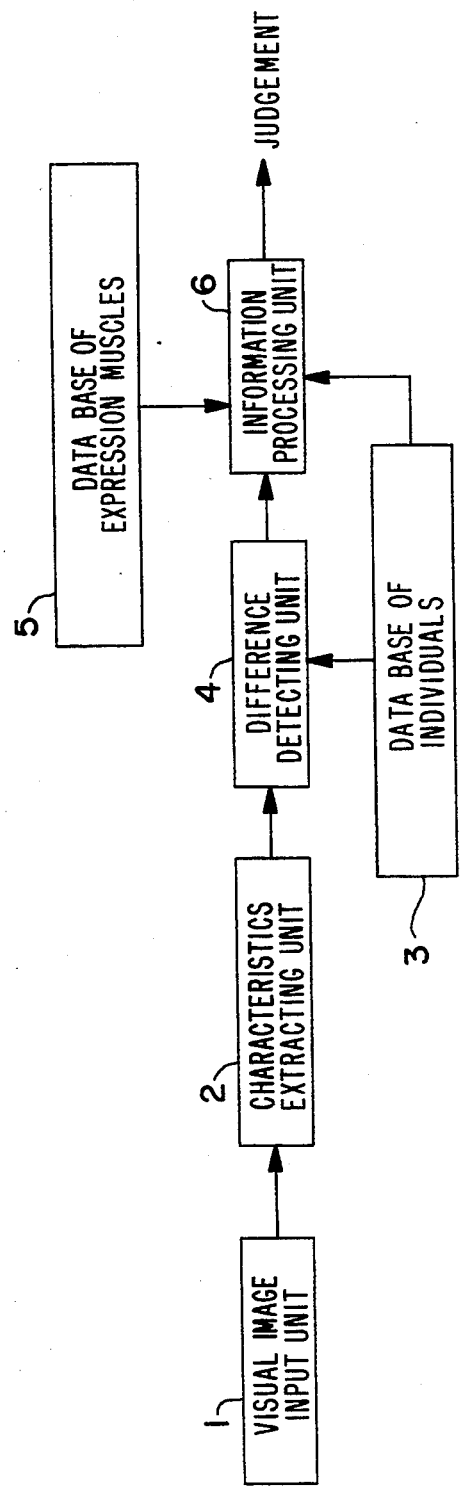
FIG. 1 is a block diagram showing an apparatus for identification of individuals as a first example of the embodiments of this invention.
Figure 2:
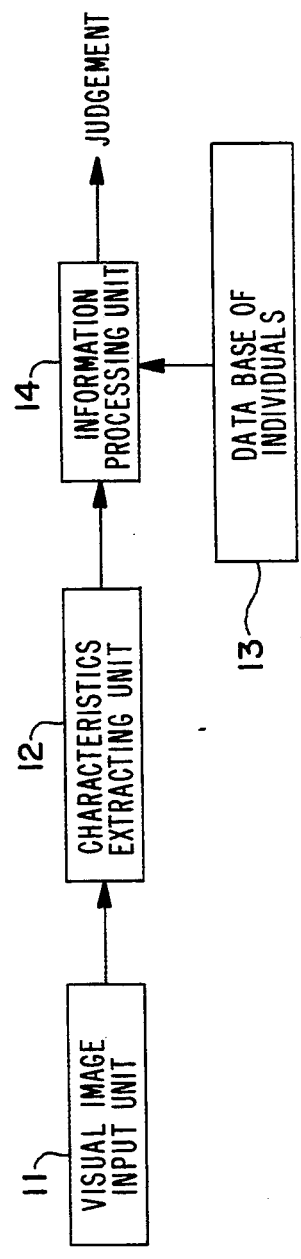
FIG. 2 is a block diagram showing a conventional apparatus for identification of individuals.

FIG. 1 is a block diagram showing a first example of the embodiments of this invention.

Item 1 is a visual image input unit to input a facial image, item 2 is a characteristics extracting unit whereby characteristic points of the facial image inputted from the visual image input unit 1 are extracted, item 3 is a data base of individuals wherein characteristic points of expressionless facial images are stored, item 4 is a difference detecting unit whereby the differences between characteristic points are found, item 5 is a data base of expression muscles wherein movement vectors of expression muscles are stored, and item 6 is an information processing unit wherein the difference information from the difference detecting unit 4, the information from the data base of expression muscles 5, and the information from data base of individuals 3 are processed for identifying the individual in question correctly.

The visual image input unit 1 picks up a facial color image of an individual to be identified through a video camera and inputs it into the characteristics extracting unit 2. In the characteristics extracting unit, the inputted visual image is A/D converted to a digital image, applied with a correction by rotating, enlarging, reducing, etc., and then transformed by extraction to the location information for each respective representative point such as eyebrow, eye, nose, mouth, etc. first by extracting the facial contour based on such pieces of information as the brightness information, the hue information, etc. and then by applying with two-valued processing, etc.

More specifically, the foregoing digital image signal comprising representative points (referred to as characteristic points hereafter) which were detected by the characteristics extracting unit 2, and whereby configurations and positions of such places of a face as aforementioned eye brow, eye, nose, mouth, etc. are decided, will be first used in correcting the tilt and dimension of the inputted color picture image by means of a series of normalization procedures such as rotation, enlargement, reduction or the like. There are various ways to find out the necessity of correcting the aforementioned tilt and dimension. A pattern template of a standard face with its various parts disposed as a record on said template is prepared in advance, and compared with the aforementioned digital picture signal to make it possible to detect the tilt, for example, of the color picture image inputted in a rough manner.

Further, the facial image of an individual to be identified is not necessarily the same as the standard face in dimensions and locations of its various parts. Therefore, in order to correct the dimensions and locational differences of the various parts against the standard face, the configurations and dimensions of the various parts of the face in question are accurately extracted by extracting the facial contour from the brightness information, the hue information or the like, and then applying two-valued processing thereto. From the extracted information the characteristic points are detected wherein configurations and locations of various parts of the face of an individual to be identified can be expressed.

The location information of characteristic points thus obtained through the characteristics extracting unit 2 is expressed by conversion on a two-dimensional (x, y) plane with the original point corresponding to the nose top (the highest point of the nose corresponding to P24 in FIG. 3) which is one of the points unaffected by changes in facial expressions.

Figure 3:
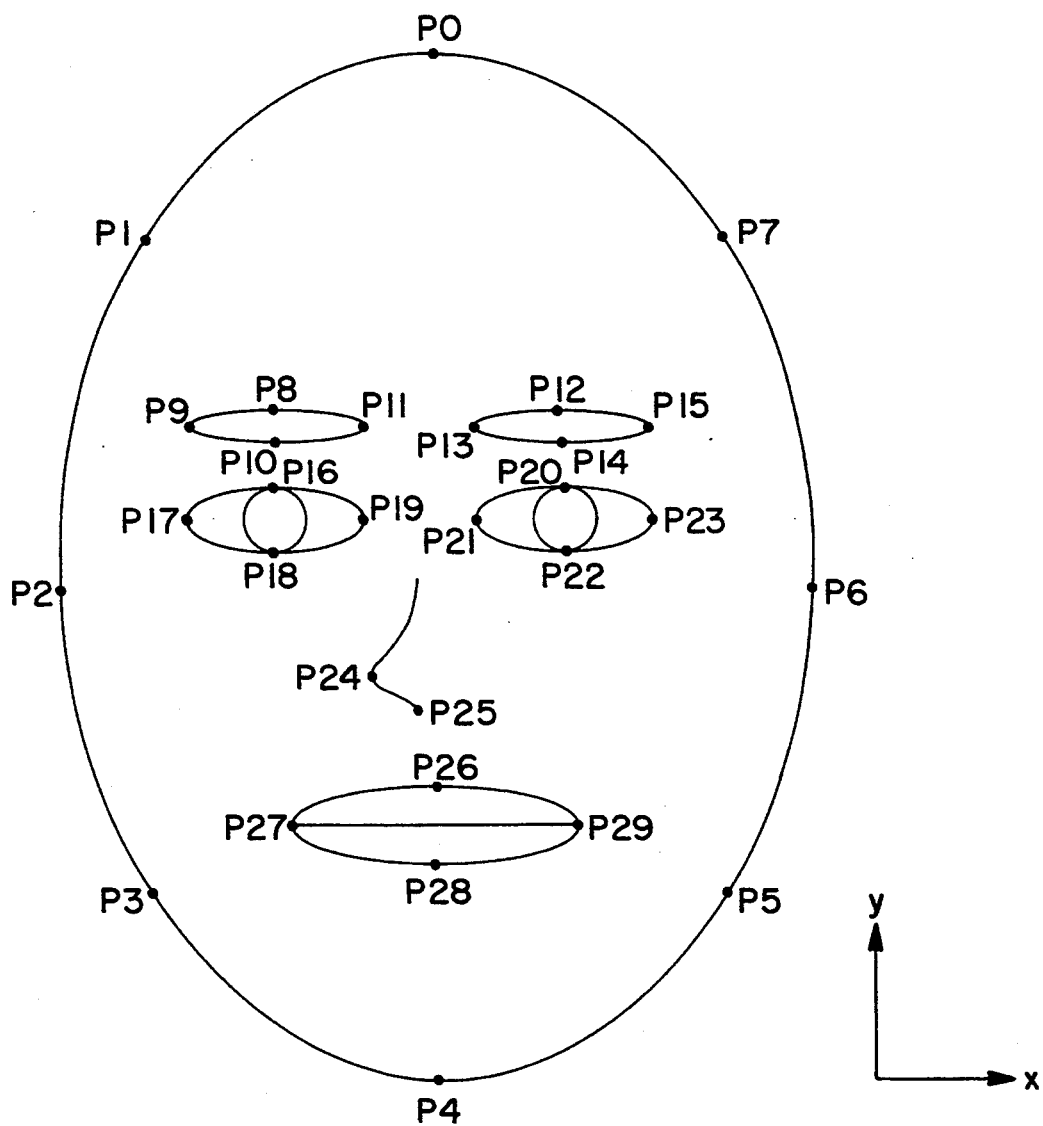
FIG. 3 is a typical diagram showing characteristic points of a facial image for the purpose of explaining how the foregoing first example works.

FIG. 3 is a diagram showing typical characteristic points of a facial image. There are 30 characteristic points from P0 to P29 in this diagram. Let the x and y coordinates of the characteristic points extracted by the foregoing characteristics extracting unit 2 be $P_{in}0$ through $P_{in}29$ respectively and also let the x and y coordinates of the characteristic points of facial images as stored in the data base of individuals 3 be $P_{dt}0$ through $P_{dt}29$ respectively. Then, the differences between the above two kinds of characteristic points calculated for each of the x and y coordinates through the difference detecting unit 4 as expressed by the calculation formula, $P_{dst}m = P_{in}m - P_{dt}m$ (m=0–29), to get the difference vectors of $P_{dst}0$ through $P_{dst}29$ for each characteristic point.

For example, suppose the coordinate of the characteristic point P20 showing the upper area of an eye is $P_{in}20$ (40, 30) and the coordinate as registered in the data base of individuals is $P_{dt}20$ (41, 35), then the difference vector gained for this point is $P_{dst}20$ (−1, −5).

Movement vectors for expression muscles are stored in the data base of expression muscles 5 for each of a plurality of individuals to be identified. The expression muscles work are used when facial expressions such as "smile" or "cry" are made. To detect the movement of the expression muscles, the facial dimensions of the subjects to be recognized and an expression serving as the criterion are needed. Therefore, changes in the expression muscles, e.g. the movement vectors, are represented by relative distances between the characteristic points, and the changes thereof when the face of the subject is expressionless. For example, a movement vector of the characteristic point P20 caused by the movement of expression muscles, that is, the right eye's up and down movement is derived by obtaining changes in the segments connecting the coordinate of the characteristic point 20, Pdt20=(41, 35) with the coordinates $P_{dt}14$ (40, 45), $P_{dt}22$ (42, 20) [, and $P_{dt}20$ (41, 35)] respectively, and the two directions of the expression muscle movement are expressed by $P_{dt}14 - P_{dt}20$ (indicating a direction pointed to by a segment connecting the coordinates Pdt14 and Pdt20), and $P_{dt}22 - P_{dt}20$ respectively.

A ratio of the maximum magnitude possible in the movement of the expression muscles against the magnitude of the segments in the reference is then established. For example, suppose the maximum magnitude is about 30% and 80% of the magnitude of the respective segments, then the movement vectors are represented as (0.3, 14, 20), and (0.8, 22, 20).

In the information processing unit 6, the components of the expression muscle movement vectors are calculated, as described in the foregoing, from the data obtained by the visual image input unit 1, the characteristics extracting unit 2 and the difference detecting unit 4, and from the information provided by the data base of individuals 3 and the data base of expression muscles 5. A judgement is then made as to whether or not the difference vectors are due to the expression muscles by comparing the calculated results with the vectors of $P_{dst}0$ through $P_{dst}29$ in magnitude and direction.

In the case of the aforementioned characteristic point P20, calculation of the movement vector thereof is performed by obtaining segments between the coordinates Pdt14 (40, 45) and Pdt20 (41, 35) and Pdt22 (42, 20) and Pdt20 (41, 35), then obtaining from the calculated value the maximum values V1 and V2 which indicate the extent the expression muscles can move. The movement vectors are calculated below.

$$V1 = 0.3 \times (Pdt14 - Pdt20)$$
$$= 0.3 \times (40 - 41, 45 - 35) = (-0.3, 3)$$
$$V2 = 0.8 \times (Pdt22 - Pdt20)$$
$$= 0.8 \times (42 - 41, 20 - 35) = (0.8, -12)$$

Thus, two actual movement vector components of $V1=(0.3, 3)$ and $V2=(0.8, -12)$ are obtained.

Next, the difference vector Pdst20 $(-1, -5)$ which indicates a difference between the picture information inputted into the characteristics extracting unit 2 and the information from the data base of individuals 3, is combined with vectors V1 and V2 which are normalized in a normalization process to get inner products thereof in order to get a difference of V1 and V2 which indicates the maximum vectors. First, in connection with V1:

$$V1 \times Pdst20 + |V1| + |Pdst20| = (-0.3) \times (-1) + (3) \cdot \times (-5) + \sqrt{(0.9+9)} + \sqrt{(1+25)} = -0.96$$

and accordingly $V1 \times Pdst = -0.96$ is obtained. Likewise, in connection with V2:

$$V2 \times Pdst20 = 0.97.$$

The inner product indicates an angle $\phi$ expressed in a cosine thereof $(\cos\phi)$ and made between a moving direction of a characteristic point (difference vector) and a moving direction in which an expression muscle may move (the vector V1 or the vector V2 in this particular case). Here, let the threshold value of the inner product be 0.9 (an angle of around 25°), then the difference vector $P_{dst}20$ relative to this characteristic point is judged to be within the scope of the expression muscle movement since $P_{dst}20$ is in the same direction as V2 and smaller in the magnitude than V2. Thus, the movement vector components of expression muscles are calculated in the information processing unit 6 according to the data base of individuals 3 and the data base of expression muscles 5, and compared with the difference vectors Pdst0 to Pdst29 in magnitude and direction to give a judgment as to whether the difference vector in question is due to expression muscles or not. More specifically, when the results of the inner product are smaller than the threshold value or the magnitude of the difference vector is larger than that of the expression muscle movement vector, the difference vector is judged as being outside the scope of the movement vector.

The same process of judgment is performed one after another on every characteristic point. Consequently, when the number of the characteristic points judged as being outside the scope of the movement vector is found to exceed a certain number, the person of the inputted facial image and the one registered in the data base of individuals are judged as being different from each other.

The data on individuals to be stored in the data base of individuals 3 are prepared in the same way as the foregoing exemplary embodiments. The facial color images of a plurality of individuals to be identified is provided by means of a TV camera or the like, and then processed through equipment having the same function as the characteristics extracting unit 2 for registering as data of characteristic points.

Also, the data on expression muscles to be stored in the data base of expression muscles 5 are likewise prepared by having facial color images of a plurality of individuals to be identified provided by means of a TV camera or the like. The images are then processed through equipment having the same function as the characteristics extracting unit 2 for registering as movement vectors which are indicative of the maximum possible extent of expression muscle movement.

Additionally, a second exemplary embodiment of this invention includes a three-dimensional image measurement apparatus described, for example, in a book titled "Three-Dimensional Image Measurement", authored by Seiji Iguchi and Kosuke Sato and published from Shoukoudo in 1990. This apparatus is used as the visual image input unit 7 to input depth information by shedding slit light on subjects in sequence. The input unit 7 includes a slit light projector, a slit mask, a scene and a camera. By virtue of this slit light projection apparatus, one imaging action produces a line image of a subject sliced with slit light, or a sheet of light. By shifting in sequence the direction of the slit light projector to scan the subject, three-dimensional data relating to the shape of the subject will be generated. The slit light projection apparatus requires such slit light that is generated by a combination of spot light and slit mask, or a combination of beam light and cylindrical lens; having zero width in the width direction and a light flux which radiates in the direction of light axis. Furthermore, in order to have only one slit image on one scanning line, the camera and projector should be located in such a way as to satisfy at least the following requirements: (a) locate the center of the slit light source on a straight line that runs through the principal point of the camera lens and in parallel with its scanning line, and (b) install the projector with its slit line perpendicular to the above-mentioned straight line.

The slit light projection apparatus differs from the first exemplary embodiment in that vectors are processed three-dimensionally instead of two-dimensionally, and the movement vectors of expression muscles and the difference vectors are compared with each other three-dimensionally. In the characteristics extracting unit 2, such processing as contour extraction, etc. is applied to the three-dimensional information obtained to extract characteristic points. Also, in the data base of individuals 3, characteristic points of a facial image of each subject to be identified are stored in the form of three-dimensional information like $(x, y, z)$. Thereafter, the same processing as employed in the first example of the embodiments of this invention is applied to the three-dimensional images obtained from the visual image input unit 1 to make a judgment whether or not the subject is identical with a person registered in the data base of individuals 3. In this occasion, such depth information as nose height, chin height, etc. that cannot be found in the first example of the embodiments of this invention is available.

As described in the above, the apparatus for identification of individuals of this invention equipped with a data base of expression muscles for identifying facial expression changes can prevent the recognition accuracy from deterioration due to the existence of expression changes between the inputted facial visual image and the image registered in the data base of individuals.

In addition, more characteristic points are available from this apparatus compared with the conventional ones which contribute to enhancing the recognition accuracy.

What is claimed is:

1. An apparatus for identification of individuals comprising:
   visual image input means for inputting a facial image of a subject to be identified,
   characteristics extracting means for extracting characteristic points which represent configurations and positions of various parts of said inputted facial image,
   data base of individuals means for storing expressionless facial images
   difference detecting means for determining difference between the characteristic points of the inputted image extracted from said characteristics extracting means and the expressionless facial images stored in said data base of individuals means, and for outputting difference vector information indicative of said difference,
   data base of expression muscles means for storing a movement vector derived from a shifting of said characteristic points caused by a movement of expression muscles which affects the facial image of said subject, and
   information processing means for identifying said subject by comparing said difference vector information obtained from said difference detecting means and said movement vector information from said data base of expression muscles means, wherein said subject represented by said facial image inputted from said visual image input means is identified.

2. An apparatus for identification of individuals according to claim 1, wherein the movement vector of the data base of expression muscles means are represented by a relative distance and directions between a plurality of characteristic points of the expressionless facial images as stored in the data base of individuals means.

3. An apparatus for identification of individuals according to claim 1, wherein the information processing means is also for comparing a direction and a magnitude of the difference vectors obtained from the difference detecting means and the movement vectors obtained from the data base of expression muscles means, and for determining if the characteristic points are within a range defined by the expression muscle movement by judging if said difference vectors when compared to said movement vectors are within a certain threshold value of said movement vectors.

4. An apparatus for identification of individuals according to claim 1, wherein the visual image input means is a three-dimensional input unit capable of inputting depth information, and wherein three-dimensional information of said people are described in the data base of individuals means.

5. An apparatus for identification of individuals comprising:
   visual image input means for inputting a facial image of a subject to be identified,
   characteristics extracting means for extracting characteristic points which represent configurations and positions of various parts of said inputted facial image,
   data base of individuals means for storing expressionless facial images,
   difference detecting means for determining the difference between said characteristic points of the inputted facial image extracted by said characteristics extracting means and the expressionless facial images stored in said data base of individuals means, and for outputting the difference as a difference vector,
   data base of expression muscles means for storing a movement vector derived from a shifting of said characteristic points caused by a movement of expression muscles which affects the facial image of said subject, and
   information processing means for identifying said subject from the inputted facial images and from said expressionless facial images stored in said data base of individuals means by determining if the difference vectors obtained from said difference means are within a threshold value of the movement vectors obtained from said data base of expression muscles means, wherein the inputted facial image and the expressionless facial image are recognized to belong to the same subject if the difference vectors are within the threshold value.

6. An apparatus for identification of individuals according to claim 5, wherein the visual image input means is a three-dimensional input unit capable of inputting depth information, and wherein three-dimensional information of people is described in the data base of individuals means.

* * * * *

UNITED STATES PATENT AND TRADEMARK OFFICE
CERTIFICATE OF CORRECTION

PATENT NO. : 5,410,609
DATED : April 25, 1995
INVENTOR(S) : Kado et al.

It is certified that error appears in the above-indentified patent and that said Letters Patent is hereby corrected as shown below:

Column 7, line 15, after "images" insert a comma --,--
Column 8, lines 36 and 37, "difference. means" should read --difference detecting means--.

Signed and Sealed this

Second Day of July, 1996

Attest:

BRUCE LEHMAN

Attesting Officer    Commissioner of Patents and Trademarks